A. C. YOUNG.
TELESCOPE LENS ADAPTER.
APPLICATION FILED MAR. 29, 1907.
910,344.
Patented Jan. 19, 1909.
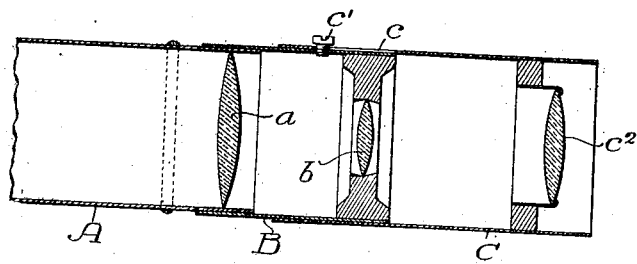
Witnesses:
Titus H. Irons
Augusta B. Cippes
Inventor:
Alfred C. Young.
by his Attorneys
Howson & Howson

UNITED STATES PATENT OFFICE.

ALFRED C. YOUNG, OF PHILADELPHIA, PENNSYLVANIA.

TELESCOPE-LENS ADAPTER.

No. 910,344.　　　　Specification of Letters Patent.　　　Patented Jan. 19, 1909.

Application filed March 29, 1907. Serial No. 365,418.

*To all whom it may concern:*

Be it known that I, ALFRED C. YOUNG, a citizen of the United States, residing in Philadelphia, Pennsylvania, have invented certain Improvements in Telescope-Lens Adapters, of which the following is a specification.

This invention consists in an attachment for that class of surveying instruments known as "transits", having for its object the provision of means whereby it shall be possible to make much shorter sights with such an instrument than is at present possible. Ordinarily an engineer in using a transit is limited to sighting upon objects not nearer than four to six feet from his instrument, and since in subway, tunnel and mine work, it is frequently necessary to take sights upon objects as near as two feet or less, I have provided a device which may be applied to or removed from a transit telescope at will, in order to accomplish this desirable end. These objects I attain as hereinafter set forth, reference being had to the accompanying drawings, in which:—the figure is a vertical section of a portion of a transit telescope, showing my invention as applied thereto.

In this figure, A represents the transit telescope barrel, the object lens $a$ being arranged and constructed in the well known manner. In order to make possible the taking of short sights with this telescope, I provide a tube B designed to fit over the end of the telescope barrel so as to be held thereon by friction, and in this tube is mounted a relatively small lens $b$.

Mounted on the tube B is a telescopically adjustable tube C, slotted as indicated at $c$ to permit of the passage of a screw $c'$ fastened in the tube B and carrying near its outer end a lens $c^2$ which as is obvious, may be moved toward and from the tube B so as to vary the distance between it and the lens $b$. It will be understood that the lenses are designed and constructed so as to render it possible to make exceedingly short sights with the telescope A; the tube C being moved toward or from the lens $b$ in order to properly focus the instrument on the mark or object observed.

I have found under practical conditions that the above device is most useful, since it can be quickly and easily applied to a transit and after use, as above described, may be removed so as to permit the transit being employed in the ordinary manner.

While I have illustrated in the drawing but a single lens in each of the tubes shown, it is obvious that under certain circumstances it might be advantageous to have more than a single lens in certain or all of the tubes in order to improve the telescopic qualities of the device.

I claim:—

1. In combination with a transit telescope, an article of the character described comprising a tube removably mounted upon the end of said telescope, a lens within said tube, and a second tube adjustably mounted on said first tube and carrying a lens therein, substantially as described.

2. In combination with a transit telescope, an attachment of the character described comprising a tube removably mounted on the end of said telescope and carrying a lens therein, a pin on said tube, a second tube surrounding said first tube and having a second lens therein, said second tube having a longitudinal slot forming a slot and pin connection with the pin on said first tube whereby the lenses carried by said tubes are adjustable relatively to each other, substantially as described.

In testimony whereof, I have signed my name to this specification, in the presence of two subscribing witnesses.

ALFRED C. YOUNG.

Witnesses:
　ADELE NETTLETON.
　WM. D. DICK.